June 3, 1969   R. H. NILSSON   3,447,425
PNEUMATIC RAILWAY VEHICLE BRAKE CYLINDER ASSEMBLIES
Filed Sept. 27, 1966
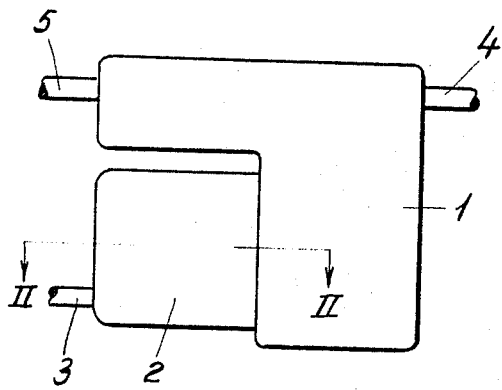
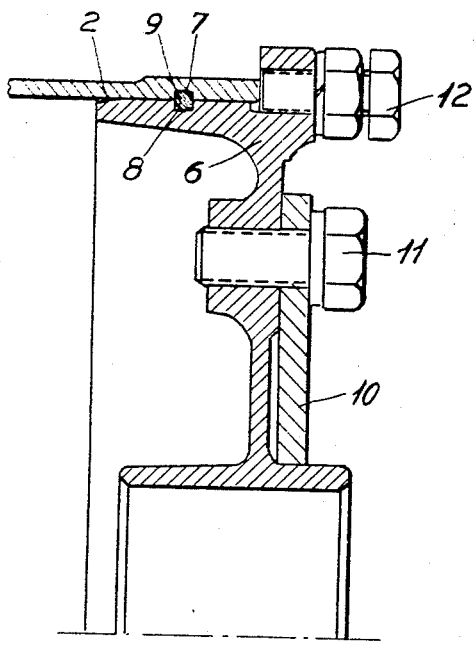
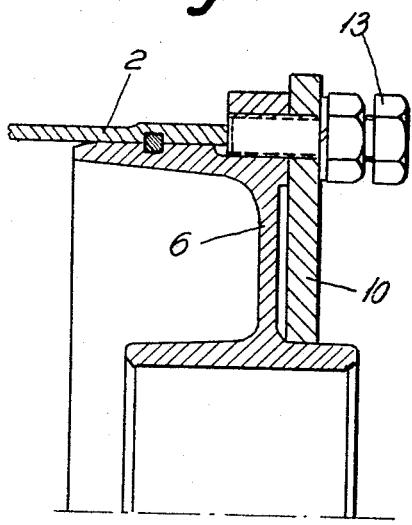
INVENTOR
Ragnar Hjalmar Nilsson
BY Watson, Cole, Grindle + Watson
ATTORNEYS with an end wall at the end remote from the cylinder head.

Two cylinders in accordance with the invention are illustrated by way of example in the accompanying drawing, in which:

FIG. 1 is a diagrammatic side view of a cylinder secured to a device for adjusting the braking forces, FIG. 2 is a detail view in section on the line II—II in FIG. 1, and FIG. 3 is a corresponding detail view illustrating a modification.

In FIG. 1, there is represented the frame 1 of a known device for automatically adjusting braking forces in dependence upon variations of vehicle loads, it being assumed that the frame 1 is secured below a railway vehicle undercarriage frame (not shown). The frame 1 also constitutes a mounting for a pneumatic brake cylinder comprising a body 2 formed integrally with an end wall (not shown), a compressed air supply pipe 3 being secured to this end wall. Forces from a piston (not shown) in the cylinder body 2 are transmitted through a variable leverage system (not shown) in the said device to two draw bars 4 and 5 for transmission to brake blocks (not shown) in known manner.

As appears from FIG. 2, the cylinder body 2 is fitted on to a cylindrical portion of a cylinder head 6, the latter supporting the body 2 and being secured by bolts 11 (of which only one is shown) to a part 10 of the frame 1. The body 2 is locked against axial displacement relative to the head 6 by a strip 9 of steel or other metal or material accommodated partially in a groove 8 in said cylindrical portion of the head 6 and partially in a groove 7 in the body 2. The strip 9 is of square cross-section and the grooves 7 and 8 are of complementary form, the strip 9 being passed into the grooves through a hole in the body 2 in known manner. The body 2 is locked against rotational displacement relative to the head 6 by a screw-threaded bolt 12 extending through a screw-threaded hole in the head 6 and bearing against the end surface of the body. The bolt 12 is furnished with a spring washer and a locknut, and more than one such bolt may be provided.

FIG. 3 illustrates a modification in which the body 2 and head 6 are of smaller diameter than those shown in FIG. 2, the part 10 being the same in both instances. FIG. 3 shows a bolt 13 which has the same function as the bolt 12 and also assists in securing the head 6 to the part 10. More than one bolt like the bolt 13 may be provided.

I claim:

1. A railway vehicle pneumatic brake cylinder assembly comprising
    (a) a mounting on a vehicle and a cylinder head secured to said mounting and having a cylindrical portion, and
    (b) a cylinder body detachably fitted to and carried by said cylindrical portion, said cylinder body being locked against axial displacement relative to said cylinder head by a strip of metal or other material accommodated partially in a groove in said cylindrical portion and partially in a groove in said cylinder body, said cylinder body being additionally locked against rotational displacement relative to said cylinder head by a screw-threaded bolt extending through a screw-threaded hole in said cylinder head and bearing against the end surface of said cylinder body, said screw-threaded bolt serving also as a means for securing said cylinder head to said mounting.

References Cited

UNITED STATES PATENTS

| | | | |
|---|---|---|---|
| 846,704 | 3/1907 | Stucy | 285—90 X |
| 2,645,513 | 7/1953 | Sterrett | 285—305 X |
| 2,890,917 | 6/1959 | Prince. | |
| 2,891,513 | 6/1959 | Fagge | 92—161 X |
| 3,005,669 | 10/1961 | Nunnemacher | 92—161 |
| 3,335,825 | 8/1967 | Mersereav et al. | 188—52 X |

MARTIN P. SCHWADRON, Primary Examiner.

IRWIN C. COHEN, Assistant Examiner.

U.S. Cl. X.R.

92—165; 220—55; 285—90